United States Patent
Xie et al.

(10) Patent No.: US 11,019,171 B2
(45) Date of Patent: May 25, 2021

(54) CACHE DATA CONTROL METHOD AND DEVICE

(71) Applicant: HUAWEI TECHNOLOGIES CO., LTD., Guangdong (CN)

(72) Inventors: Renchao Xie, Beijing (CN); Junfeng Xie, Beijing (CN); Hualin Zhu, Shanghai (CN); Tao Huang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/700,109

(22) Filed: Dec. 2, 2019

(65) Prior Publication Data

US 2020/0106852 A1 Apr. 2, 2020

Related U.S. Application Data

(63) Continuation of application No. PCT/CN2018/089975, filed on Jun. 5, 2018.

(30) Foreign Application Priority Data

Jun. 5, 2017 (CN) .......................... 201710412883.0

(51) Int. Cl.
*H04L 29/08* (2006.01)

(52) U.S. Cl.
CPC ...... *H04L 67/2842* (2013.01); *H04L 67/1097* (2013.01); *H04L 67/26* (2013.01)

(58) Field of Classification Search
CPC .. H04L 67/2842; H04L 67/1097; H04L 67/26
See application file for complete search history.

(56) References Cited

U.S. PATENT DOCUMENTS

| | | | | |
|---|---|---|---|---|
| 7,451,225 B1* | 11/2008 | Todd | .................. | G06F 12/0862 709/229 |
| 7,526,553 B1* | 4/2009 | Todd | .................. | G06F 12/0862 709/226 |

(Continued)

FOREIGN PATENT DOCUMENTS

| | | |
|---|---|---|
| CN | 103139658 A | 6/2013 |
| CN | 104967651 A | 10/2015 |

(Continued)

OTHER PUBLICATIONS

International Search Report for PCT/CN2018/089975, dated Aug. 29, 2018, 4 pages.

*Primary Examiner* — Jerry B Dennison

(57) ABSTRACT

This disclosure provides a cache data control method and a device, applied to a first edge cache node. The method includes: receiving a data obtaining request sent from a terminal device, where the data obtaining request includes an identification of to-be-requested data; when the first edge cache node does not include the to-be-requested data, determining a target cache node that includes the to-be-requested data in an edge cache node set corresponding to the first edge cache node and a central cache node corresponding to the first edge cache node; and obtaining the to-be-requested data from the target cache node. This disclosure is intended to improve efficiency of feeding back data information to the terminal device.

12 Claims, 7 Drawing Sheets

(56) References Cited

U.S. PATENT DOCUMENTS

| | | | | |
|---|---|---|---|---|
| 7,565,493 | B1* | 7/2009 | Todd | G06F 12/0862 |
| | | | | 709/221 |
| 10,306,005 | B1* | 5/2019 | Trachtman | H04L 67/2842 |
| 10,771,524 | B1* | 9/2020 | Long | H04L 67/1063 |
| 10,826,793 | B2* | 11/2020 | Varney | H04L 47/70 |
| 10,938,884 | B1* | 3/2021 | Baldwin | H04L 63/0428 |
| 2002/0065899 | A1* | 5/2002 | Smith | H04L 67/1095 |
| | | | | 709/214 |
| 2005/0125627 | A1* | 6/2005 | Kilian | H04L 45/7453 |
| | | | | 711/202 |
| 2008/0065718 | A1* | 3/2008 | Todd | H04L 67/28 |
| | | | | 709/203 |
| 2008/0082648 | A1* | 4/2008 | Ahmed | H04L 67/2842 |
| | | | | 709/223 |
| 2010/0057894 | A1* | 3/2010 | Glasser | H04L 29/12066 |
| | | | | 709/222 |
| 2010/0268789 | A1* | 10/2010 | Yoo | H04L 67/2842 |
| | | | | 709/214 |
| 2012/0106612 | A1* | 5/2012 | Haywood | H04N 21/23106 |
| | | | | 375/227 |
| 2012/0311062 | A1* | 12/2012 | Frydman | G06F 15/17331 |
| | | | | 709/212 |
| 2013/0159473 | A1* | 6/2013 | Newton | H04L 67/2852 |
| | | | | 709/219 |
| 2014/0173135 | A1* | 6/2014 | Varney | H04L 67/2842 |
| | | | | 709/245 |
| 2015/0012593 | A1* | 1/2015 | Phillips | H04L 47/823 |
| | | | | 709/204 |
| 2016/0094891 | A1* | 3/2016 | Hall | H04N 21/64315 |
| | | | | 725/63 |
| 2016/0323408 | A1* | 11/2016 | Chung | H04L 67/2842 |
| 2017/0155734 | A1 | 6/2017 | Zhang et al. | |
| 2018/0131783 | A1* | 5/2018 | Caulfield | H04L 67/2847 |
| 2018/0337795 | A1* | 11/2018 | Katrak | H04L 63/12 |
| 2019/0007522 | A1* | 1/2019 | Satzke | H04L 67/322 |
| 2020/0034050 | A1* | 1/2020 | Brasfield | G06F 3/0619 |

FOREIGN PATENT DOCUMENTS

| | | |
|---|---|---|
| CN | 105072172 A | 11/2015 |
| CN | 105593837 A | 5/2016 |
| CN | 105763628 A | 7/2016 |
| CN | 106454430 A | 2/2017 |
| EP | 2466498 A2 | 6/2012 |
| EP | 3 017 377 B1 | 11/2018 |

* cited by examiner

CACHE DATA CONTROL METHOD AND DEVICE

CROSS-REFERENCE TO RELATED APPLICATION

This application is a continuation of International Application No. PCT/CN2018/089975, filed on Jun. 5, 2018, which claims priority to Chinese Patent Application No. 201710412883.0, filed on Jun. 5, 2017. The disclosures of the aforementioned applications are hereby incorporated by reference in their entireties.

TECHNICAL FIELD

This application relates to the field of communications technologies, and in particular, to a cache data control method and a device.

BACKGROUND

A cache node is usually deployed between a data server and a terminal device. The cache node may cache some data in the data server. When the terminal device needs to obtain data information from the data server, the terminal device may obtain required data information from the cache node.

Currently, two levels of cache nodes are usually deployed between the data server and the terminal device, and are respectively marked as a level-1 cache node and a level-2 cache node. The terminal device may directly communicate with a level-1 cache node, the level-1 cache node may directly communicate with the level-2 cache node, and the level-2 cache node may directly communicate with the data server. When the terminal device needs to obtain data information, the terminal device first requests to obtain the data information from the level-1 cache node. If the data information is cached in the level-1 cache node, the level-1 cache node sends the data information to the terminal device. If the data information is not cached in the level-1 cache node, the level-1 cache node requests to obtain the data information from the level-2 cache node and sends the data information to the device. If the data information is also not cached in the level-2 cache node, the level-2 cache node requests to obtain the data information from the data server and sends the data information to the level-1 cache node, and the level-1 cache node sends the data information to the terminal device.

As evident from the foregoing in the prior art, when the terminal device needs to obtain data information, the terminal device needs to request, level by level, to obtain data from each cache node and the data server. Consequently, efficiency of feeding back the data information to the terminal device is low.

SUMMARY

Embodiments of the present disclosure provide a cache data control method and a device, to improve efficiency of feeding back data information to a terminal device.

According to a first aspect, this disclosure provides a cache data control method. The method includes: after a first edge cache node receives a data obtaining request that is sent from a terminal device and that includes an identification of to-be-requested data, determining, by the first edge cache node, whether the to-be-requested data is cached in the first edge cache node; if yes, locally obtaining, by the first edge cache node, the to-be-requested data; or if not, determining, by the first edge cache node, a target cache node that includes the to-be-requested data in an edge cache node set corresponding to the first edge cache node and a central cache node corresponding to the first edge cache node, and obtaining the to-be-requested data from the target cache node.

In the foregoing process, because the first edge cache node may communicate with each edge cache node in the edge cache node set, the first edge cache node may obtain the to-be-requested data from more cache nodes. Further, the first edge cache node may select the target cache node in which the to-be-requested data is cached, and obtains the to-be-requested data from the target cache node, and there is no need to request to obtain the to-be-requested data from each level of cache nodes step by step, thereby improving efficiency of feeding back data information to the terminal device.

In a possible implementation, the determining, by the first edge cache node, a target cache node that includes the to-be-requested data in an edge cache node set corresponding to the first edge cache node and a central cache node corresponding to the first edge cache node includes:

determining, based on the identification of the to-be-requested data, one or more hit cache nodes that include the to-be-requested data in the edge cache node set and the central cache node; and determining the target cache node in the one or more hit cache nodes based on a quantity of hit cache nodes and a cache node type included in the one or more hit cache nodes.

Optionally, when it is determined that the quantity of hit cache nodes is 1, the hit cache node is determined as the target cache node.

Optionally, when it is determined that the one or more hit cache nodes include at least two second edge cache nodes, the target cache node is determined in the at least two second edge cache nodes based on link quality between the first edge cache node and each second edge cache node; and Optionally, when it is determined that the one or more hit cache nodes include a third edge cache node and the central cache node, a parallel request message is sent to the third edge cache node and the central cache node, a parallel response message sent from the third edge cache node and a parallel response message sent from the central cache node are received, and a cache node corresponding to the parallel response message that is received first is determined as the target cache node.

In another possible implementation, when it is determined that no hit cache node exists in the edge cache node set and the central cache node, the to-be-requested data is obtained from a data server through requesting; or a data obtaining request is sent to the central cache node, so that the central cache node sends the to-be-requested data to the first edge cache node after obtaining the to-be-requested data through the requesting.

According to a second aspect, this disclosure provides a cache data control method. The method includes: receiving, by a cache controller, a data push request message sent from a data server, where the data push request message includes an identification of to-be-pushed data, and the to-be-pushed data is determined and obtained by the data server based on data access information of a plurality of cache nodes; and determining, by the cache controller, an edge cache node corresponding to the to-be-pushed data based on the data access information, and pushing the to-be-pushed data to the edge cache node.

In the foregoing process, the cache controller reports the data access information of the cache nodes to the data server, so that the data server can determine the to-be-pushed data based on the data access information of the cache nodes, and push the to-be-pushed data to a corresponding edge cache node. In this way, the to-be-pushed data determined and obtained by the data server based on the data access information is usually data that a user likes, and actively pushes the to-be-pushed data to the edge cache node. When the terminal device needs to obtain the data, the edge cache node may send, to the terminal device, the data information cached by the edge cache node, thereby improving efficiency of feeding back data information to the terminal device.

Optionally, the to-be-pushed data may be pushed to the target cache node by using the following two feasible implementations:

One feasible implementation is:

A first data push message is sent to the edge cache node, where the first data push message includes an address of the data server and the identification of the to-be-pushed data, and the first data push message is used to instruct the edge cache node to obtain the to-be-pushed data from the data server.

The other feasible implementation is:

The to-be-pushed data is pushed to a central cache node corresponding to the edge cache node; and a second data push message is sent to the edge cache node, where the second data push message includes an address of the central cache node and the identification of the to-be-pushed data, and the second data push message is used to instruct the edge cache node to obtain the to-be-pushed data from the central cache node.

According to a third aspect, this disclosure provides an edge cache node, including: a receiver, a processor, a memory, and a communications bus, where the memory is configured to store a program instruction, the communications bus is configured to implement connection between the components, and the processor is configured to read the program instruction in the memory, where the receiver is configured to receive a data obtaining request sent from a terminal device, where the data obtaining request includes an identification of to-be-requested data;

the processor is configured to: when the edge cache node does not include the to-be-requested data, determine a target cache node that includes the to-be-requested data in an edge cache node set corresponding to the edge cache node and a central cache node corresponding to the edge cache node; and the processor is further configured to obtain the to-be-requested data from the target cache node.

In a possible implementation, the processor is specifically configured to:

determine, based on the identification of the to-be-requested data, one or more hit cache nodes that include the to-be-requested data in the edge cache node set and the central cache node; and determine the target cache node in the one or more hit cache nodes based on a quantity of hit cache nodes and a cache node type included in the one or more hit cache nodes.

In another possible implementation, the processor is specifically configured to:

when it is determined that the quantity of hit cache nodes is 1, determine the hit cache node as the target cache node;

when it is determined that the one or more hit cache nodes include at least two second edge cache nodes, determine the target cache node in the at least two second edge cache nodes based on link quality between the edge cache node and each second edge cache node; and when it is determined that the one or more hit cache nodes include a third edge cache node and the central cache node, send a parallel request message to the third edge cache node and the central cache node, receive a parallel response message sent from the third edge cache node and a parallel response message sent from the central cache node, and determine a cache node corresponding to the parallel response message that is received first, as the target cache node.

In another possible implementation, the edge cache node further includes a transmitter, where the transmitter is configured to: when the processor determines that no hit cache node exists in the edge cache node set and the central cache node, request to obtain the to-be-requested data from a data server; or the transmitter is configured to: when the processor determines that no hit cache node exists in the edge cache node set and the central cache node, send the data obtaining request to the central cache node, so that the central cache node sends the to-be-requested data to the edge cache node after obtaining the to-be-requested data through the requesting.

According to a fourth aspect, this disclosure provides a cache controller, including a receiver, a processor, a transmitter, a memory, and a communications bus, where the memory is configured to store a program instruction, the communications bus is configured to implement connection between the components, and the processor is configured to read the program instruction in the memory, where the receiver is configured to: receive a data push request message sent from a data server, where the data push request message includes an identification of to-be-pushed data, and the to-be-pushed data is determined and obtained by the data server based on data access information of a plurality of cache nodes;

the processor is configured to determine an edge cache node corresponding to the to-be-pushed data based on the data access information; and the transmitter is configured to push the to-be-pushed data to the edge cache node.

In a possible implementation, the transmitter is specifically configured to:

send a first data push message to the edge cache node, where the first data push message includes an address of the data server and the identification of the to-be-pushed data, and the first data push message is used to instruct the edge cache node to obtain the to-be-pushed data from the data server.

In another possible implementation, the transmitter is specifically configured to:

push the to-be-pushed data to a central cache node corresponding to the edge cache node; and send a second data push message to the edge cache node, where the second data push message includes an address of the central cache node and the identification of the to-be-pushed data, and the second data push message is used to instruct the edge cache node to obtain the to-be-pushed data from the central cache node.

According to a fifth aspect, this disclosure provides a cache data control apparatus, applied to a first edge cache node, where the cache data control apparatus includes a receiving module, a determining module, and an obtaining module, where:

the receiving module is configured to receive a data obtaining request sent from a terminal device, where the data obtaining request includes an identification of to-be-requested data;

the determining module is configured to: when the first edge cache node does not include the to-be-requested data, determine a target cache node that includes the to-be-requested data in an edge cache node set corresponding to the first edge cache node and a central cache node corresponding to the first edge cache node; and the obtaining module is configured to obtain the to-be-requested data from the target cache node.

In a possible implementation, the determining module includes a first determining unit and a second determining unit, where the first determining unit is configured to determine, based on the identification of the to-be-requested data, one or more hit cache nodes that include the to-be-requested data in the edge cache node set and the central cache node; and the second determining unit is configured to determine the target cache node in the one or more hit cache nodes based on a quantity of hit cache nodes and a cache node type included in the one or more hit cache nodes.

In another possible implementation, the second determining unit is specifically configured to:

when it is determined that the quantity of hit cache nodes is 1, determine the hit cache node as the target cache node;

when it is determined that the one or more hit cache nodes include at least two second edge cache nodes, determine the target cache node in the at least two second edge cache nodes based on link quality between the first edge cache node and each second edge cache node; and when it is determined that the one or more hit cache nodes include a third edge cache node and the central cache node, send a parallel request message to the third edge cache node and the central cache node, receive a parallel response message sent from the third edge cache node and a parallel response message sent from the central cache node, and determine a cache node corresponding to the parallel response message that is received first, as the target cache node.

In another possible implementation, the cache data control apparatus further includes a sending module, where the sending module is configured to: when the determining module determines that no hit cache node exists in the edge cache node set and the central cache node, request to obtain the to-be-requested data from a data server; or the sending module is configured to: when the determining module determines that no hit cache node exists in the edge cache node set and the central cache node, send the data obtaining request to the central cache node, so that the central cache node sends the to-be-requested data to the first edge cache node after obtaining the to-be-requested data through the requesting.

According to a sixth aspect, this disclosure provides a cache data control apparatus, applied to a cache controller, where the cache data control apparatus includes a receiving module, a determining module, and a sending module, where:

the receiving module is configured to receive a data push request message sent from a data server, where the data push request message includes an identification of to-be-pushed data, and the to-be-pushed data is determined and obtained by the data server based on data access information of a plurality of cache nodes;

the determining module is configured to determine an edge cache node corresponding to the to-be-pushed data based on the data access information; and the sending module is configured to push the to-be-pushed data to the edge cache node.

In a possible implementation, the sending module is specifically configured to:

send a first data push message to the edge cache node, where the first data push message includes an address of the data server and the identification of the to-be-pushed data, and the first data push message is used to instruct the edge cache node to obtain the to-be-pushed data from the data server.

In another possible implementation, the sending module is specifically configured to:

push the to-be-pushed data to a central cache node corresponding to the edge cache node; and send a second data push message to the edge cache node; where the second data push message includes an address of the central cache node and the identification of the to-be-pushed data, and the second data push message is used to instruct the edge cache node to obtain the to-be-pushed data from the central cache node.

According to the cache data control method and the device provided in this disclosure, after the first edge cache node receives the data obtaining request sent from the terminal device, if the to-be-requested data required by the terminal device is not cached in the first edge cache node, the first edge cache node determines the target cache node in the edge cache node set corresponding to the first edge cache node and the central cache node corresponding to the first edge cache node, where the target cache node is a node including the to-be-requested data, and the first edge cache node requests to obtain the to-be-requested data from the target cache node and sends the to-be-requested data to the terminal device. Because the first edge cache node may communicate with each edge cache node in the edge cache node set, the first edge cache node may obtain the to-be-requested data from more cache nodes. Further, the first edge cache node may select the target cache node in which the to-be-requested data is cached, and obtain the to-be-requested data from the target cache node, and there is no need to request to obtain the to-be-requested data from each level of cache nodes step by step, thereby improving efficiency of feeding back data information to the terminal device.

DESCRIPTION OF EMBODIMENTS

Figure 1:
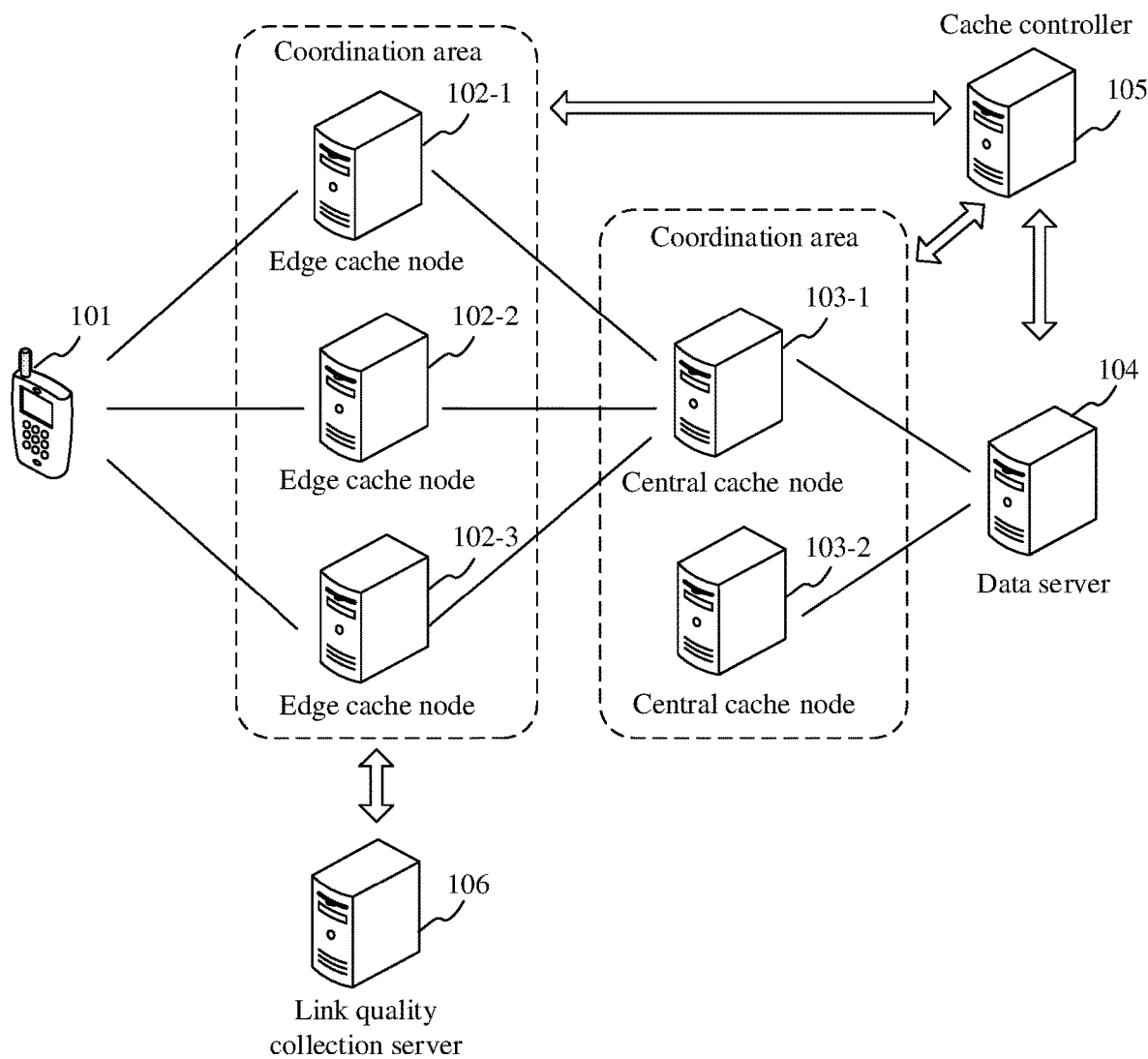
FIG. 1 is a network architecture diagram for cache data control according to an embodiment of this disclosure.

FIG. 1 is a network architecture diagram for cache data control according to this disclosure. Referring to FIG. 1, the network architecture diagram includes a terminal device 101, a plurality of edge cache nodes 102-1 to 102-3, a plurality of central cache nodes 103-1 to 103-2, a data server 104, a cache controller 105, and a link quality collection server 106. A plurality of types of data information required by the terminal device 101 is stored in the data server 104, and some data information in the data server 104 is cached in the edge cache nodes and the central cache nodes.

Referring to FIG. 1, a plurality of edge cache nodes form an edge cache node set, and every two edge cache nodes in a same edge cache node set can directly communicate with each other. For example, every two edge cache nodes may communicate with each other through a virtual private network (VPN), and usually, a plurality of edge cache nodes located in an adjacent area may form one edge cache node set. A plurality of central cache nodes form a central cache node set, and every two central cache nodes in a same central cache node set may directly communicate with each other. For example, every two central cache nodes may communicate with each other through a VPN, and usually, a plurality of central cache nodes located in an adjacent area may form a central cache node set. A plurality of edge cache nodes in a same edge cache node set usually correspond to one central cache node, and a plurality of edge cache nodes in the edge cache node set may directly communicate with the corresponding central cache node.

The cache controller 105 may communicate with the cache nodes (the edge cache nodes and the central cache nodes) and the data server 104. The cache controller may obtain an identification of data cached in each cache node. The cache controller may further collect data access information of each cache node, where the data access information may include a quantity of times each piece of data information is accessed, or the like; and the cache controller may send the data access information of the cache node to the data server. The cache controller may further push, to the cache node, pushed data determined and obtained by the data server.

The link quality collection server 106 may collect link quality between every two edge cache nodes in the edge cache node set, and may further send the collected link quality to each edge cache node.

It should be noted that FIG. 1 merely shows a network architecture by using an example. Certainly, the network architecture may further include more levels of cache nodes, for example, a level-3 cache node. A network architecture to which this disclosure is applicable is not specifically limited in this disclosure.

In this disclosure, after an edge cache node receives a data obtaining request sent from the terminal device, if data information required by the terminal device is not stored in the edge cache node, the cache node may determine a target cache node from an edge cache node set and a corresponding central cache node and obtain the data information from the target cache node, and there is no need to obtain the data information level by level. In this way, required data information can be quickly obtained, thereby improving efficiency of obtaining the data information.

Specific embodiments are used below to describe in detail the technical solutions of this disclosure. It should be noted that, the following specific embodiments may be combined with each other, and same or similar content is not repeatedly described in different embodiments.

Figure 2:
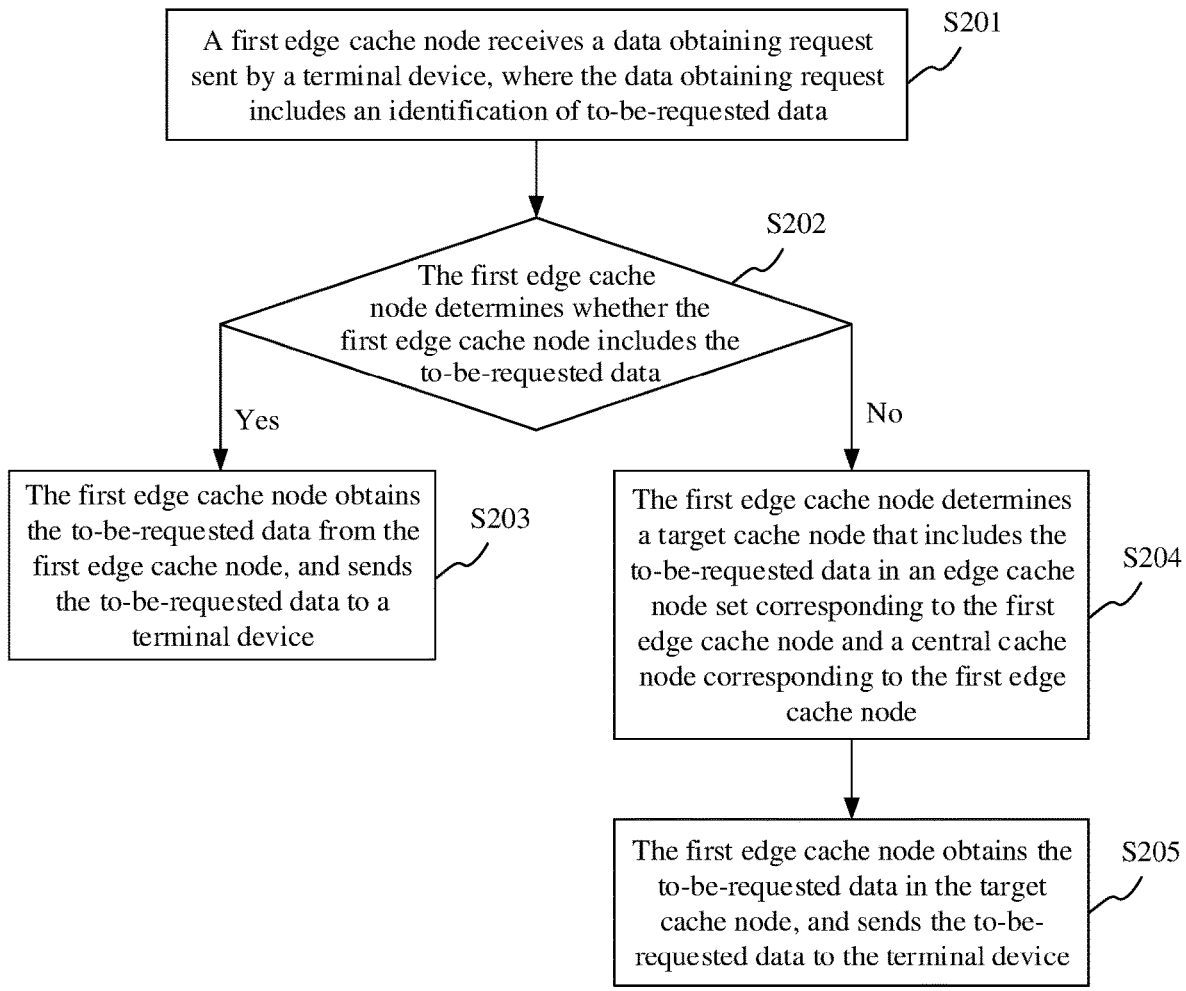
FIG. 2 is a first schematic flowchart of a cache data control method according to an embodiment of this disclosure.

FIG. 2 is a first schematic flowchart of a cache data control method according to this disclosure. Referring to FIG. 2, the method may include the following steps.

S201. A first edge cache node receives a data obtaining request sent from a terminal device, where the data obtaining request includes an identification of to-be-requested data.

In this disclosure, an edge cache node is usually a cache node that can directly communicate with the terminal device. For example, the edge cache node may be a mobile edge computing (MEC) node. A central cache node is usually a cache node that can directly communicate with a data server. For example, the central cache node may be a distributed gateway (DGW).

Optionally, the identification of the to-be-requested data may be a uniform resource locator (URL) address of the to-be-requested data.

Certainly, in an actual disclosure process, the data obtaining request may further include other content, for example, an identification of the terminal device. Content included in the data obtaining request may be set based on an actual requirement. This is not specifically limited in this disclosure.

S202. The first edge cache node determines whether the first edge cache node includes the to-be-requested data.

If yes, perform S203.

If not, perform S204 and S205.

Optionally, the first edge cache node may include identifications of all data cached in the first edge cache node. Correspondingly, the first edge cache node may determine whether the to-be-requested data is cached in the first edge cache node, based on the identification of the to-be-requested data and the identifications of all the data cached in the first edge cache node.

S203. The first edge cache node obtains the to-be-requested data from the first edge cache node, and sends the to-be-requested data to the terminal device.

If the to-be-requested data is cached in the first edge cache node, the first cache node directly obtains the to-be-requested data from the first cache node, and sends the to-be-requested data to the terminal device.

S204. The first edge cache node determines a target cache node that includes the to-be-requested data in an edge cache node set corresponding to the first edge cache node and a central cache node corresponding to the first edge cache node.

Optionally, the edge cache node set corresponding to the first edge cache node is an edge cache node set in which the first edge cache node is located. The edge cache node set includes a plurality of edge cache nodes, and the first edge cache node and an edge cache node in the edge cache node set are usually located in a same adjacent area.

One edge cache node usually corresponds to one central cache node, and one central cache node may correspond to a plurality of edge cache nodes, where an edge cache node may directly communicate with a corresponding central cache node.

Figure 3:
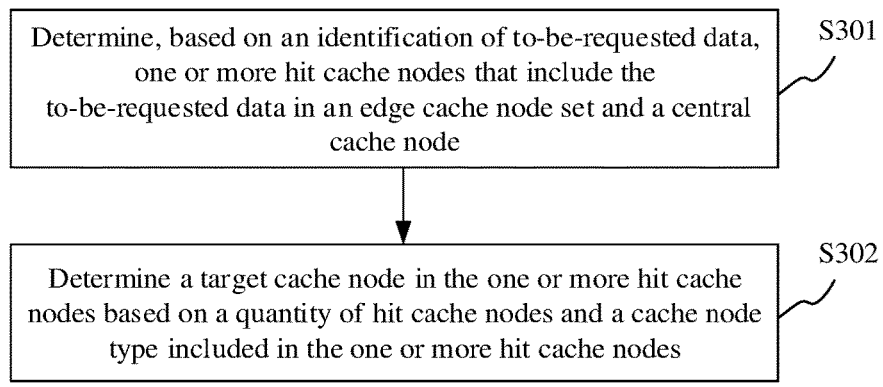
FIG. 3 is a schematic flowchart of a method for determining a target cache node according to an embodiment of the present disclosure.

It should be noted that the method for determining a target cache node is described in detail in an embodiment shown in FIG. 3, and details are not described herein again.

It should be further noted that, if the target cache node does not exist in the edge cache node set and the central cache node, the first edge cache node may obtain the to-be-requested data by using the following two feasible implementations:

One feasible implementation is:

The first edge cache node requests to obtain the to-be-requested data from the data server.

Optionally, the first edge cache node may send a data obtaining request to the data server, where the data obtaining request may include an identification of the first edge cache node and the identification of the to-be-requested content. Correspondingly, the data server sends the to-be-requested data to the first edge cache node.

After the first edge cache node obtains the to-be-requested data, the first edge cache node may cache the to-be-requested data. After caching the to-be-requested data, the first edge cache node may further send an update request to a cache controller, so that the cache controller updates the identification of the data cached in the first edge cache node.

The other feasible implementation is:

The first edge cache node sends a data obtaining request to the central cache node, so that the central cache node sends the to-be-requested data to the first edge cache node after obtaining the to-be-requested data through the requesting.

Optionally, the first edge cache node sends a data obtaining request to the central cache node, where the data obtaining request may include the identification of the first edge cache node and the identification of the to-be-requested content; after the central cache node receives the data obtaining request, the central cache node obtains the to-be-requested data from an adjacent central cache node or the data server, and sends the to-be-requested data to the first edge cache node.

After the central cache node obtains the to-be-requested data, the central cache node caches the to-be-requested data. After the central cache node caches the to-be-requested data, the central cache node may further send an update request to the cache controller, so that the cache controller updates the identification of the data cached in the central cache node. After the first edge cache node obtains the to-be-requested data, the first edge cache node may cache the to-be-requested data. After caching the to-be-requested data, the first edge cache node may further send an update request to the cache controller, so that the cache controller updates the identification of the data cached in the first edge cache node.

S205. The first edge cache node obtains the to-be-requested data from the target cache node, and sends the to-be-requested data to the terminal device.

In an actual disclosure process, after the first edge cache node sends the to-be-requested data to the terminal device, the first edge cache node may locally cache the to-be-requested data. In this way, when receiving the data obtaining request for requesting the data next time, the first edge cache node may directly send the locally-cached data to the terminal device.

According to the cache data control method provided in this disclosure, after the first edge cache node receives the data obtaining request sent from the terminal device, if the to-be-requested data required by the terminal device is not cached in the first edge cache node, the first edge cache node determines the target cache node in the edge cache node set corresponding to the first edge cache node and the central cache node corresponding to the first edge cache node, where the target cache node is a node including the to-be-requested data, and the first edge cache node requests to obtain the to-be-requested data from the target cache node and sends the to-be-requested data to the terminal device. Because the first edge cache node may communicate with each edge cache node in the edge cache node set, the first edge cache node may obtain the to-be-requested data from more cache nodes. Further, the first edge cache node may select the target cache node in which the to-be-requested data is cached, and obtain the to-be-requested data from the target cache node, and there is no need to request to obtain the to-be-requested data from each level of cache nodes step by step, thereby improving efficiency of feeding back data information to the terminal device.

Based on any one of the foregoing embodiments, optionally, the target cache node that includes the to-be-requested data may be determined by using the following feasible implementation (S204 in the embodiment shown in FIG. 2). For details, refer to the embodiment shown in FIG. 3.

FIG. 3 is a schematic flowchart of a method for determining a target cache node according to an embodiment of the present disclosure. Referring to FIG. 3, the method may include the following steps.

S301. Determine, based on an identification of to-be-requested data, one or more hit cache nodes that include the to-be-requested data in an edge cache node set and a central cache node.

Optionally, a preset cache data list may be obtained in a first edge cache node, where the preset cache data list includes identifications of a plurality of cache nodes and an identification of cache data in each cache node. Correspondingly, the first edge cache node may determine one or more hit cache nodes in the edge cache node set and a central cache node based on the identification of the to-be-requested data and the preset cache data list.

Optionally, the preset cache data list may be sent from a cache controller to the first edge cache node, or the preset cache data list may be obtained by the first edge cache node from the cache controller. The preset cache data list is generated by the cache controller based on an identification of the data included in cache nodes. The cache controller may request, from the cache node, the identification of the data cached in the cache node, or the cache node may actively report, to the cache controller, the identification of the data cached by the cache node.

Optionally, all cache nodes in one network framework may correspond to one preset cache data list. Correspondingly, the preset cache data list may include an identification of data cached by each cache node in the network architecture and an identification of data cached in each cache node. For example, the preset cache data list may be shown in Table 1:

TABLE 1

| Identification of a cache node | Identification of cache data |
|---|---|
| Edge cache node 1 | URL 1, URL 3, URL 4, . . . |
| Edge cache node 2 | URL 2, URL 3, URL 4, . . . |

TABLE 1-continued

| Identification of a cache node | Identification of cache data |
| --- | --- |
| ... | ... |
| Edge cache node M | URL 1, URL 2, URL 3, ... |
| Central cache node 1 | URL 3, URL 4, URL 6, ... |
| Central cache node 2 | URL 3, URL 4, URL 5, ... |
| ... | ... |
| Central cache node N | URL 5, URL 6, URL 7, ... |

Referring to Table 1, the preset cache data list includes identifications of data cached in all edge cache nodes in the network architecture, and identifications of data cached in all central cache nodes in the network architecture.

Optionally, each edge cache node set may correspond to a preset cache data list. Correspondingly, the preset cache data list includes an identification of each edge cache node in the edge cache node set and an identification of a corresponding central cache node, and an identification of data cached in each edge cache node in the edge cache node set and an identification of data cached in the corresponding central cache node. For example, for any edge cache node set 1, a preset cache data list corresponding to the edge cache node set 1 may be shown in Table 2.

TABLE 2

| Identification of a cache node | Identification of cache data |
| --- | --- |
| Edge cache node 1 | URL 1, URL 3, URL 4, ... |
| Edge cache node 2 | URL 2, URL 3, URL 4, ... |
| Edge cache node 3 | URL 1, URL 2, URL 3, ... |
| Central cache node 1 | URL 5, URL 6, URL 7, ... |

Referring to Table 2, the edge cache node set 1 includes an edge cache node 1 to an edge cache node 3, and a central cache node corresponding to the edge cache node set 1 is a central cache node 1. The preset cache data list includes an identification of data cached in each edge cache node in the edge cache node set 1 and an identification of data cached in the central cache node 1.

S302. Determine a target cache node in the one or more hit cache nodes based on a quantity of hit cache nodes and a cache node type included in the one or more hit cache nodes.

When the quantity of hit cache nodes is 1, the hit cache node is determined as the target cache node.

When the quantity of hit cache nodes is greater than 1, the target cache node is determined in the one or more hit cache nodes based on the cache node type included in the one or more hit cache nodes. Specifically, at least the following two cases are included:

One possible case is as follows: The one or more hit cache nodes include at least two second edge cache nodes.

In this possible case, the first edge cache node obtains link quality between the first edge cache node and each second edge cache node, and determines the target cache node in the at least two second edge cache nodes based on the link quality between the first edge cache node and each second edge cache node.

Optionally, a link quality collection server may collect link quality between every two edge cache nodes in each edge cache node set in real time or periodically, and store or send the collected link quality to the edge cache nodes. Correspondingly, the first edge cache node may determine link quality between the first edge cache node and each second edge cache node based on the link quality collected by the link quality collection server.

Optionally, the first edge cache node may determine a second edge cache node having highest link quality with the first edge cache node, as the target cache node.

Another possible case is as follows: The one or more hit cache nodes include a third edge cache node and a central cache node.

In this possible case, a parallel request message is sent to the third edge cache node and the central cache node at the same time, a parallel response message sent from the third edge cache node and a parallel response message sent from the central cache node are received, and the cache node corresponding to the parallel response message that is received first is determined as the target cache node.

Optionally, the parallel request message may include an address of the first edge cache node, an identification of to-be-requested content, and a parallel request identifier, and correspondingly, the parallel response message may include the address of the first edge cache node, the identification of the to-be-requested content, and a content acknowledgment identifier. Certainly, the parallel request message and the parallel response message may further include other content. This is not specifically limited in this disclosure.

Optionally, for a cache node corresponding to a parallel response message received later, the first edge cache node may further send a rejection message to the cache node, where the rejection message is used to instruct the cache node to cancel sending the to-be-requested data to the first edge cache node. Optionally, the rejection message may include the address of the first edge cache node, the identification of the to-be-requested content, and a content rejection identifier. Certainly, the rejection message may further include other content. This is not specifically limited in this disclosure.

It should be noted that in this possible case, when a quantity of third edge cache nodes included in the one or more hit cache nodes is greater than 1, a third edge cache node is selected from a plurality of third edge cache nodes based on link quality between the first edge cache node and each third edge cache node, and then the foregoing process is performed on the selected third edge cache node and the central cache node, to determine the target cache node in the selected third edge cache node and the central cache node.

For example, it is assumed that the first edge cache node is an edge cache node 1, and the one or more hit cache nodes include two edge cache nodes (respectively marked as an edge cache node 2 and an edge cache node 3) and a central cache node 1. In this case, the edge cache node 1 first selects an edge cache node from the edge cache node 2 and the edge cache node 3 based on link quality between the edge cache node 1 and the edge cache node 2 and link quality between the edge cache node 1 and the edge cache node 3. Assuming that the link quality between the edge cache node 2 and the edge cache node 1 is better than the link quality between the edge cache node 3 and the edge cache node 1, the edge cache node 1 selects the edge cache node 2.

The edge cache node 1 sends a parallel request message to the edge cache node 2 and the central cache node 1 at the same time, and after receiving the parallel request message, each of the edge cache node 2 and the central cache node 1 sends a parallel response message to the edge cache node 1. Assuming that the edge cache node 1 first receives a parallel response message sent from the edge cache node 2, the edge cache node 1 determines the edge cache node 2 as the target cache node. Further, the edge cache node 1 further sends a rejection message to the central cache node 1, to instruct the central cache node 1 not to send the to-be-requested data to the edge cache node 1.

Figure 4:
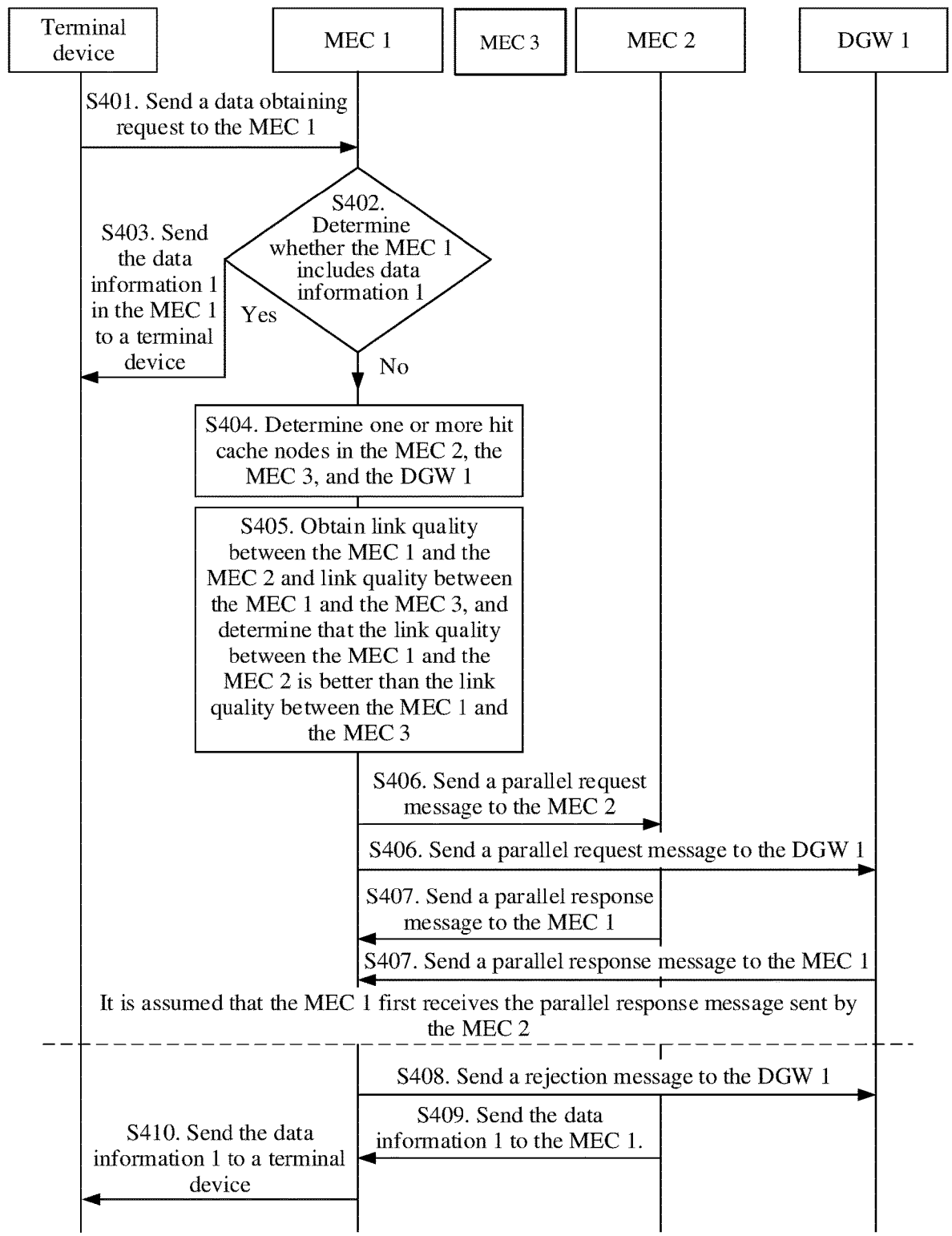
FIG. 4 is a second schematic flowchart of a cache data control method according to an embodiment of this disclosure.

Based on any one of the foregoing embodiments, the following describes in detail, with reference to FIG. 4 by using a specific example, the technical solution shown in the foregoing method embodiment.

In an embodiment shown in FIG. 4, a first edge cache node is an MEC 1, and an MEC set 1 in which the MEC 1 is located further includes an MEC 2 and an MEC 3. It is further assumed that a central cache node corresponding to the MEC set 1 is a DGW 1, and a DGW set in which the DGW 1 is located further includes a DGW 2.

FIG. 4 is a second schematic flowchart of a cache data control method according to this disclosure. Referring to FIG. 4, the method may include the following steps.

S401. A terminal device sends a data obtaining request to the MEC 1, where the data obtaining request includes a URL of data information 1.

S402. The MEC 1 determines whether the MEC1 includes the data information 1.

If yes, perform S403.

If not, perform S404.

S403. The MEC 1 sends the data information 1 in the MEC 1 to the terminal device.

S404: The MEC 1 determines one or more hit cache nodes in the MEC 2, the MEC 3, and the DGW 1.

Assuming that the data information 1 is cached in each of the MEC 2, the MEC 3, and the DGW 1, the MEC 1 determines the MEC 2, the MEC 3, and the DGW 1 as hit cache nodes.

S405. The MEC 1 obtains link quality between the MEC 1 and the MEC 2 and link quality between the MEC 1 and the MEC 3, and determines that the link quality between the MEC 1 and the MEC 2 is better than the link quality between the MEC 1 and the MEC 3.

S406. The MEC 1 sends a parallel request message to the MEC 2 and the DGW 1 at the same time.

S407. Each of the MEC 2 and the DGW 1 sends a parallel response message to the MEC 1.

S408. Assuming that the MEC 1 first receives the parallel response message sent from the MEC 2, the MEC 1 sends a rejection message to the DGW 1.

S409. The MEC 2 sends the data information 1 to the MEC 1.

S410. The MEC 1 sends the data information 1 to the terminal device.

In the foregoing process, after the MEC 1 receives the data obtaining request sent from the terminal device, if the to-be-requested data required by the terminal device is not cached in the MEC 1, the MEC 1 determines, in the MEC 2, the MEC 3, and the DGW 1, that a target node is the MEC 2, where the MEC 2 includes the data information 1 requested by the terminal device, the link quality between the MEC 2 and the MEC 1 is better. Therefore, the MEC 1 can quickly obtain the data information 1, and quickly send the data information 1 to the terminal device, thereby improving efficiency of feeding back the data information to the terminal device.

Figure 5:
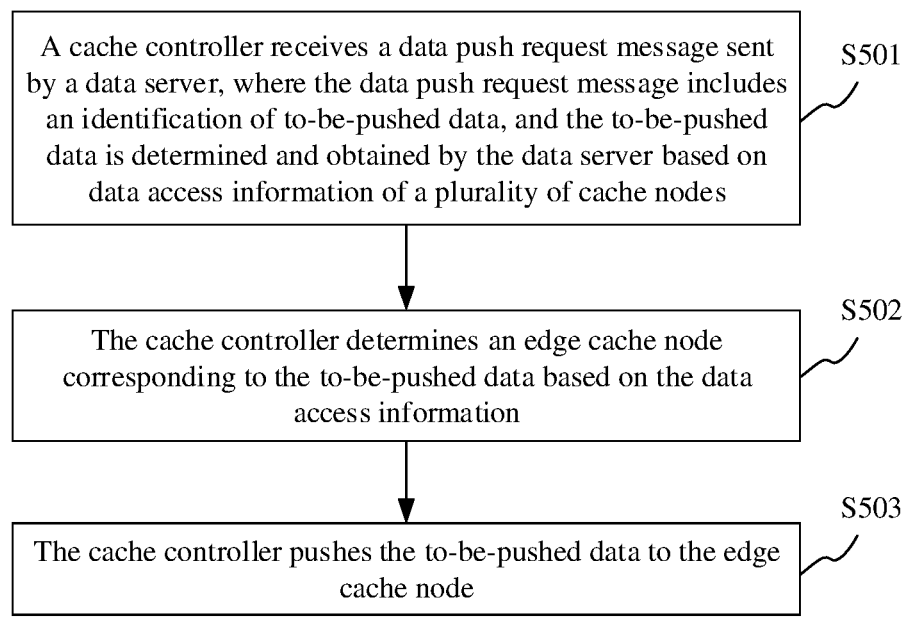
FIG. 5 is a third schematic flowchart of a cache data control method according to an embodiment of this disclosure.

FIG. 5 is a third schematic flowchart of a cache data control method according to this disclosure. Referring to FIG. 5, the method may include the following steps.

S501. A cache controller receives a data push request message sent from a data server, where the data push request message includes an identification of to-be-pushed data, and the to-be-pushed data is determined and obtained by the data server based on data access information of a plurality of cache nodes.

In the embodiment shown in FIG. 5, the cache controller may obtain the data access information of the cache nodes in real time or periodically. Optionally, the data access information may include a time point at which each piece of data in the cache nodes is accessed, and the data access information may further include a quantity of times each piece of data in the cache nodes is accessed. Certainly, the data access information may further include attribute information or the like of a user accessing each piece of data in the cache nodes. In an actual disclosure process, content included in the data access information may be set based on an actual requirement. This is not specifically limited in this disclosure.

After obtaining the data access information of the cache nodes, the cache controller may directly send the obtained data access information to the data server, or may summarize the data access information and send the summarized data access information to the data server.

After the data server receives the data access information, the data server determines the to-be-pushed data based on the data access information. Optionally, the data server may determine a hot data type based on the data access information, and determine data corresponding to the hot data type as the to-be-pushed data.

Optionally, the data push request message may further include other content, for example, an address of the data server and the type of the to-be-pushed data. Certainly, in an actual disclosure process, content included in the data push request may be set based on an actual requirement. This is not specifically limited in this disclosure.

S502. The cache controller determines an edge cache node corresponding to the to-be-pushed data based on the data access information.

Optionally, the data access information may include attribute information of a user accessing each piece of data in the cache node. Correspondingly, the cache controller may determine a push area based on the attribute information of the user, where a similarity between user attribute information of a user in the push area and the user attribute information in the data access information is greater than a preset threshold.

Certainly, the cache controller may also determine all the edge cache nodes as edge cache nodes corresponding to the to-be-pushed data, and the cache controller may further determine an edge cache node in which the to-be-pushed data is not cached, as the edge cache node corresponding to the to-be-pushed data.

S503. The cache controller pushes the to-be-pushed data to the edge cache node.

Optionally, the cache controller may push the to-be-pushed data to the target cache node by using the following two feasible implementations:

One feasible implementation is:

The cache controller sends a first data push message to the edge cache node, where the first data push message includes an address of the data server and the identification of the to-be-pushed data, and the first data push message is used to instruct the edge cache node to obtain the to-be-pushed data from the data server.

In this feasible implementation, the cache controller directly instructs the edge cache node to obtain the to-be-pushed data from the data server.

The other feasible implementation is:

The cache controller pushes the to-be-pushed data to a central cache node corresponding to the edge cache node, and the cache controller sends a second data push message to the edge cache node, where the second data push message includes an address of the central cache node and the identification of the to-be-pushed data, and the second data push message is used to instruct the edge cache node to obtain the to-be-pushed data from the central cache node.

In this feasible implementation, the cache controller first instructs the central cache node corresponding to the edge cache node to obtain the to-be-pushed data from the data server, and then the cache controller instructs the edge cache node to obtain the to-be-pushed data from the corresponding central cache node.

In the embodiment shown in FIG. 5, the cache controller reports the data access information of the cache nodes to the data server, so that the data server can determine the to-be-pushed data based on the data access information of the cache nodes, and push the to-be-pushed data to the corresponding edge cache node. In this way, the to-be-pushed data determined and obtained by the data server based on the data access information is usually data that a user likes, and actively pushes the to-be-pushed data to the edge cache node. When the terminal device needs to obtain the data, the edge cache node may send, to the terminal device, the data information cached by the edge cache node, thereby improving efficiency of feeding back data information to the terminal device.

Figure 6:
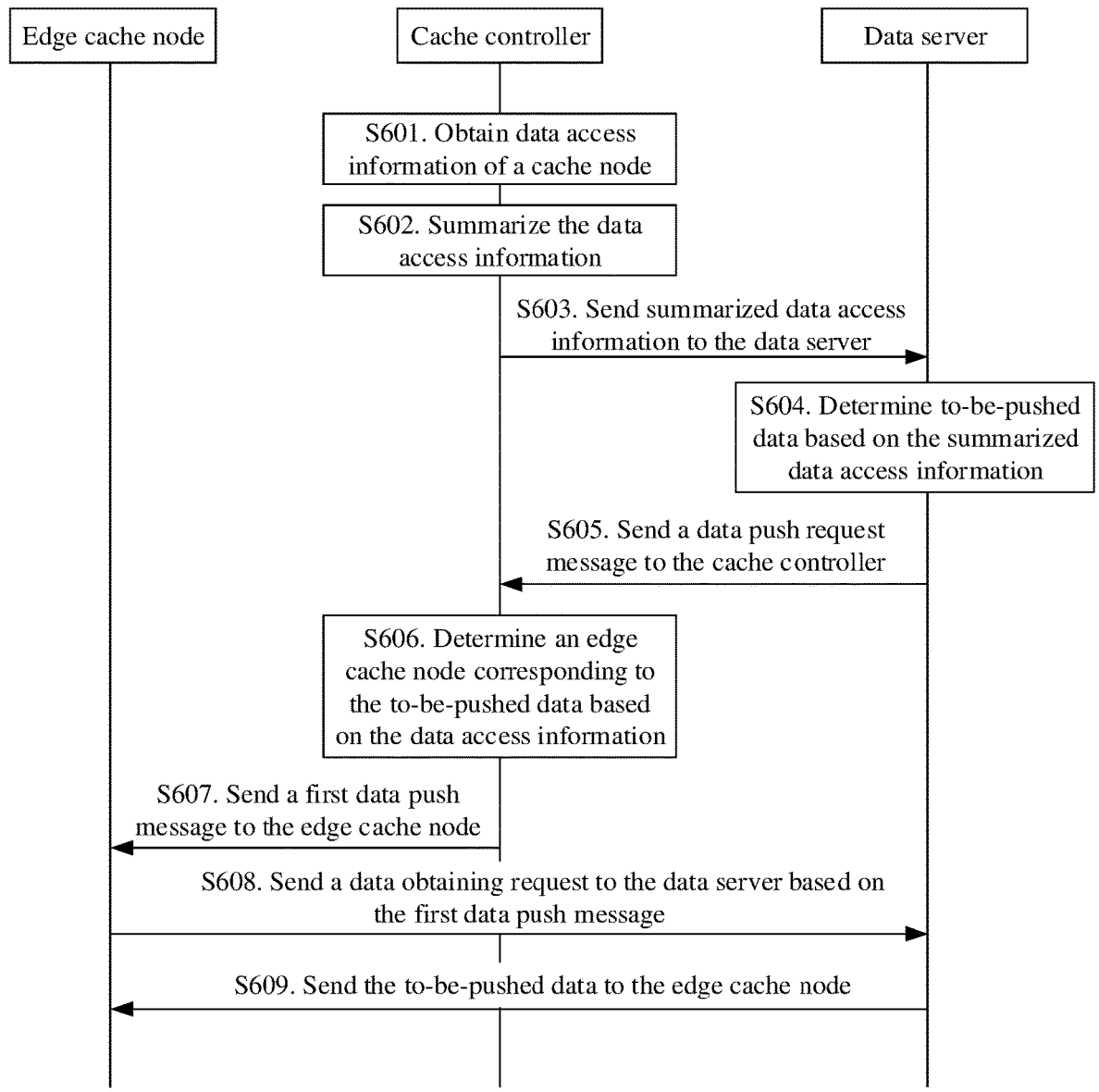
FIG. 6 is a fourth schematic flowchart of a cache data control method according to an embodiment of this disclosure.

Based on the embodiment shown in FIG. 5, the following describes in detail, with reference to FIG. 6 by using a specific example, the technical solution shown in the embodiment in FIG. 5.

FIG. 6 is a fourth schematic flowchart of a cache data control method according to this disclosure. Referring to FIG. 6, the method may include the following steps.

S601. A cache controller obtains data access information of a cache node.

S602. The cache controller summarizes the data access information.

Optionally, the cache controller may delete some obtained data access information, or abstract and integrate a plurality of pieces of data access information into one piece, or the like. For example, assuming that the data access information includes an access time point of each piece of data in the cache node, the cache controller may correspondingly summarize a plurality of pieces of data access information, to determine a quantity of times of accessing each piece of data.

S603. The cache controller sends summarized data access information to a data server.

S604. The data server determines to-be-pushed data based on the summarized data access information.

S605: The data server sends a data push request message to the cache controller, where the data push request message includes an identification of the to-be-pushed data.

S606. The cache controller determines an edge cache node corresponding to the to-be-pushed data based on the data access information.

S607. The cache controller sends a first data push message to the edge cache node, where the first data push message includes an address of the data server and a URL of the to-be-pushed data.

S608. The edge cache node sends a data obtaining request to the data server based on the first data push message, where the data obtaining request includes the URL of the to-be-pushed data.

S609. The data server sends the to-be-pushed data to the edge cache node.

Figure 7:
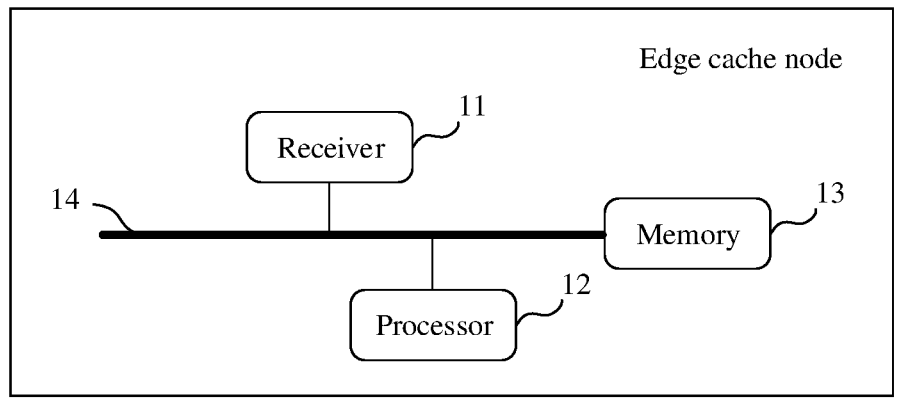
FIG. 7 is a first schematic structural diagram of an edge cache node according to an embodiment of this disclosure.

FIG. 7 is a first schematic structural diagram of an edge cache node according to this disclosure. Referring to FIG. 7, the edge cache node includes a receiver 11, a processor 12, a memory 13, and a communications bus 14, where the memory 13 is configured to store a program instruction, the communications bus 14 is configured to implement connection between the components, and the processor 12 is configured to read the program instruction in the memory, where the receiver 11 is configured to receive a data obtaining request sent from a terminal device, where the data obtaining request includes an identification of to-be-requested data;

the processor 12 is configured to: when the edge cache node does not include the to-be-requested data, determine a target cache node that includes the to-be-requested data in an edge cache node set corresponding to the edge cache node and a central cache node corresponding to the edge cache node; and the processor 12 is further configured to obtain the to-be-requested data from the target cache node.

The edge cache node shown in this disclosure can perform the technical solution shown in the foregoing method embodiment. An implementation principle and a beneficial effect of the edge cache node are similar to those of the technical solution, and details are not described herein again.

In a possible implementation, the processor 12 is specifically configured to:

determine, based on the identification of the to-be-requested data, one or more hit cache nodes that include the to-be-requested data in the edge cache node set and the central cache node; and determine the target cache node in the one or more hit cache nodes based on a quantity of hit cache nodes and a cache node type included in the one or more hit cache nodes.

In another possible implementation, the processor 12 is specifically configured to:

when it is determined that the quantity of hit cache nodes is 1, determine the hit cache node as the target cache node;

when it is determined that the one or more hit cache nodes include at least two second edge cache nodes, determine the target cache node in the at least two second edge cache nodes based on link quality between the edge cache node and each second edge cache node; and when it is determined that the one or more hit cache nodes include a third edge cache node and the central cache node, send a parallel request message to the third edge cache node and the central cache node, receive a parallel response message sent from the third edge cache node and a parallel response message sent from the central cache node, and determine a cache node corresponding to the parallel response message that is received first, as the target cache node.

Figure 8:
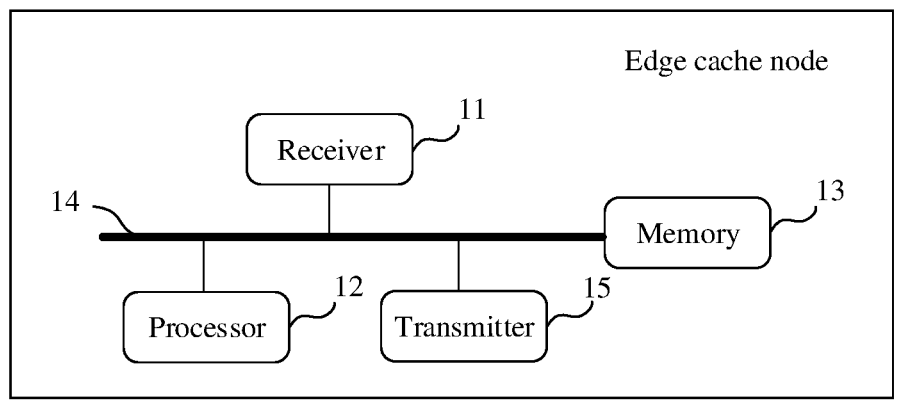
FIG. 8 is a second schematic structural diagram of an edge cache node according to an embodiment of this disclosure.

FIG. 8 is a second schematic structural diagram of an edge cache node according to this disclosure. Based on the embodiment shown in FIG. 7, referring to FIG. 8, the edge cache node further includes a transmitter 15, where the transmitter 15 is configured to: when the processor 12 determines that no hit cache node exists in the edge cache node set and the central cache node, request to obtain the to-be-requested data from a data server; or the transmitter 15 is configured to: when the processor 12 determines that no hit cache node exists in the edge cache node set and the central cache node, send the data obtaining request to the central cache node, so that the central cache node sends the to-be-requested data to the edge cache node after obtaining the to-be-requested data through the requesting.

The edge cache node shown in this disclosure can perform the technical solution shown in the foregoing method embodiment. An implementation principle and a beneficial effect of the edge cache node are similar to those of the technical solution, and details are not described herein again.

Figure 9:
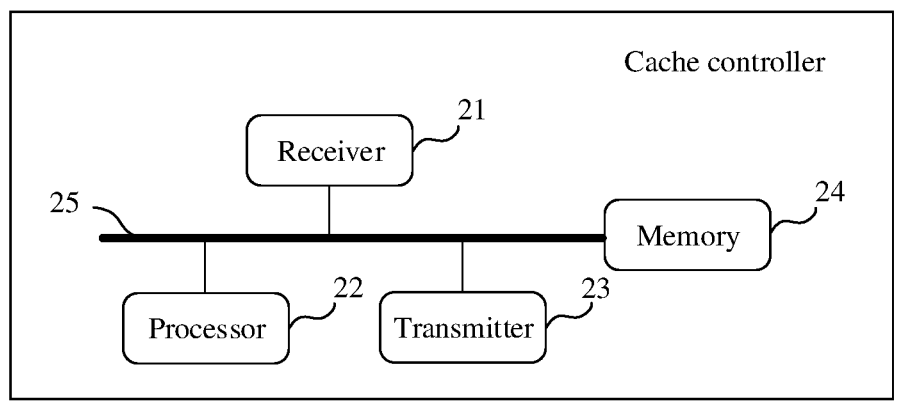
FIG. 9 is a schematic structural diagram of a cache controller according to an embodiment of this disclosure.

FIG. 9 is a schematic structural diagram of a cache controller according to this disclosure. Referring to FIG. 9, the cache controller includes a receiver 21, a processor 22, a transmitter 23, a memory 24, and a communications bus 25, where the memory 24 is configured to store a program instruction, the communications bus 25 is configured to implement connection between the components, and the processor 22 is configured to read the program instruction in the memory, where the receiver 21 is configured to receive a data push request message sent from a data server, where the data push request message includes an identification of to-be-pushed data, and the to-be-pushed data is determined and obtained by the data server based on data access information of a plurality of cache nodes;

the processor 22 is configured to determine an edge cache node corresponding to the to-be-pushed data based on the data access information; and the transmitter 23 is configured to push the to-be-pushed data to the edge cache node.

The cache controller shown in this disclosure may perform the technical solution shown in the foregoing method embodiment. An implementation principle and a beneficial effect of the cache controller are similar to those of the technical solution, and details are not described herein again.

In a possible implementation, the transmitter 23 is specifically configured to:

send a first data push message to the edge cache node, where the first data push message includes an address of the data server and the identification of the to-be-pushed data, and the first data push message is used to instruct the edge cache node to obtain the to-be-pushed data from the data server.

In another possible implementation, the transmitter 23 is specifically configured to:

push the to-be-pushed data to a central cache node corresponding to the edge cache node; and send a second data push message to the edge cache node, where the second data push message includes an address of the central cache node and the identification of the to-be-pushed data, and the second data push message is used to instruct the edge cache node to obtain the to-be-pushed data from the central cache node.

The cache controller shown in this disclosure may perform the technical solution shown in the foregoing method embodiment. An implementation principle and a beneficial effect of the cache controller are similar to those of the technical solution, and details are not described herein again.

Figure 10:
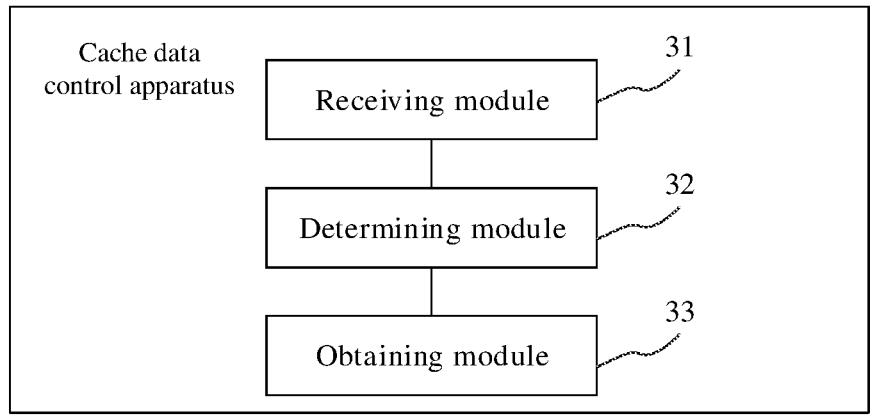
FIG. 10 is a first schematic structural diagram of a cache data control apparatus according to an embodiment of this disclosure.

FIG. 10 is a first schematic structural diagram of a cache data control apparatus according to this disclosure. The apparatus may be disposed on a first edge cache node. Referring to FIG. 10, the apparatus may include a receiving module 31, a determining module 32, and an obtaining module 33, where the receiving module 31 is configured to receive a data obtaining request sent from a terminal device, where the data obtaining request includes an identification of to-be-requested data;

the determining module 32 is configured to: when the first edge cache node does not include the to-be-requested data, determine a target cache node that includes the to-be-requested data in an edge cache node set corresponding to the first edge cache node and a central cache node corresponding to the first edge cache node; and the obtaining module 33 is configured to obtain the to-be-requested data from the target cache node.

The cache data control apparatus shown in this disclosure may perform the technical solution shown in the foregoing method embodiment. An implementation principle and a beneficial effect of the cache data control apparatus are similar to those of the technical solution, and details are not described herein again.

Figure 11:
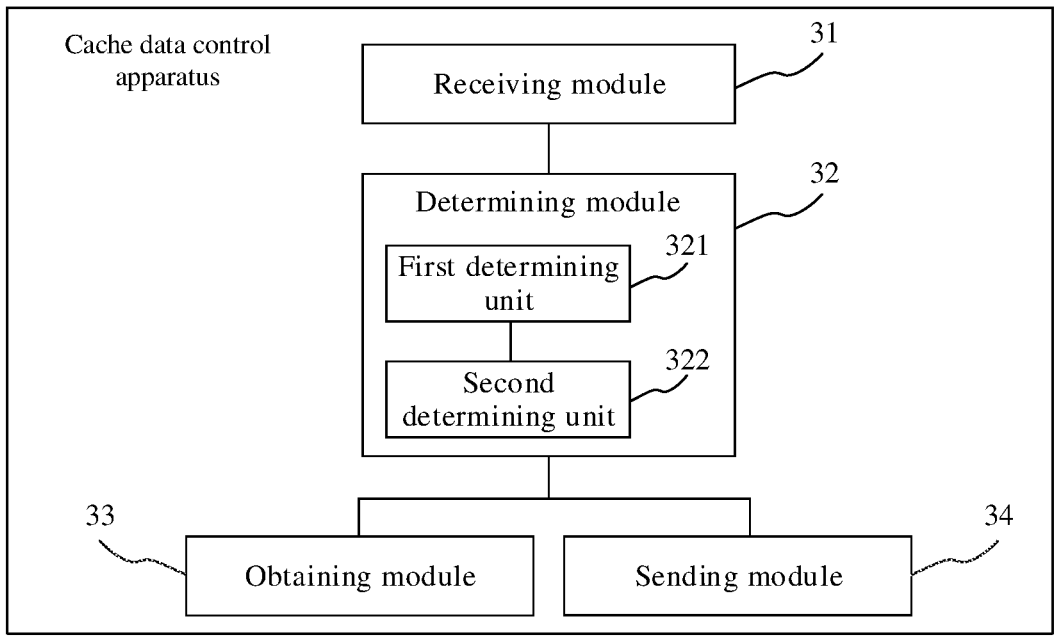
FIG. 11 is a second schematic structural diagram of a cache data control apparatus according to an embodiment of this disclosure.

FIG. 11 is a second schematic structural diagram of a cache data control apparatus according to this disclosure. Referring to FIG. 11, the determining module 32 includes a first determining unit 321 and a second determining unit 322, where the first determining unit 321 is configured to determine, based on the identification of the to-be-requested data, one or more hit cache nodes that include the to-be-requested data in the edge cache node set and the central cache node; and the second determining unit 322 is configured to determine the target cache node in the one or more hit cache nodes based on a quantity of hit cache nodes and a cache node type included in the one or more hit cache nodes.

In a possible implementation, the second determining unit 322 is specifically configured to:

when it is determined that the quantity of hit cache nodes is 1, determine the hit cache node as the target cache node;

when it is determined that the one or more hit cache nodes include at least two second edge cache nodes, determine the target cache node in the at least two second edge cache nodes based on link quality between the first edge cache node and each second edge cache node; and when it is determined that the one or more hit cache nodes include a third edge cache node and the central cache node, send a parallel request message to the third edge cache node and the central cache node, receive a parallel response message sent from the third edge cache node and a parallel response message sent from the central cache node, and determine a cache node corresponding to the parallel response message that is received first, as the target cache node.

In another possible implementation, the cache data control apparatus further includes a sending module 34, where the sending module 34 is configured to: when the determining module 32 determines that no hit cache node exists in the edge cache node set and the central cache node, request to obtain the to-be-requested data from a data server; or the sending module 34 is configured to: when the determining module 32 determines that no hit cache node exists in the edge cache node set and the central cache node, send the data obtaining request to the central cache node, so that the central cache node sends the to-be-requested data to the first edge cache node after obtaining the to-be-requested data through the requesting.

The cache data control apparatus shown in this disclosure may perform the technical solution shown in the foregoing method embodiment. An implementation principle and a beneficial effect of the cache data control apparatus are similar to those of the technical solution, and details are not described herein again.

Figure 12:
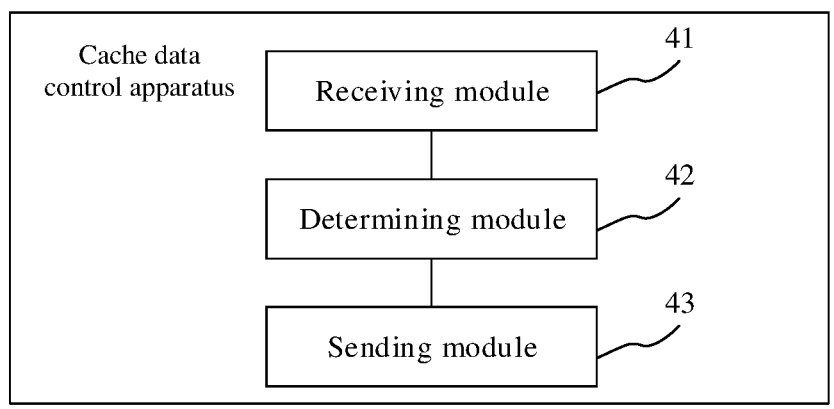
FIG. 12 is a schematic structural diagram of another cache data control apparatus according to an embodiment of this disclosure.

FIG. 12 is a schematic structural diagram of another cache data control apparatus according to this disclosure. The cache data control apparatus may be disposed in a cache controller. Referring to FIG. 12, the cache data control apparatus includes a receiving module 41, a determining module 42, and a sending module 43, where the receiving module 41 is configured to: receive a data push request message sent from a data server, where the data push request message includes an identification of to-be-pushed data, and the to-be-pushed data is determined and obtained by the data server based on data access information of a plurality of cache nodes; and the determining module 42 is configured to determine an edge cache node corresponding to the to-be-pushed data based on the data access information; and the sending module 43 is configured to push the to-be-pushed data to the edge cache node.

The cache data control apparatus shown in this disclosure may perform the technical solution shown in the foregoing method embodiment. An implementation principle and a beneficial effect of the cache data control apparatus are similar to those of the technical solution, and details are not described herein again.

In a possible implementation, the sending module 43 is specifically configured to:

send a first data push message to the edge cache node, where the first data push message includes an address of the data server and the identification of the to-be-pushed data, and the first data push message is used to instruct the edge cache node to obtain the to-be-pushed data from the data server.

In another possible implementation, the sending module 43 is specifically configured to:

push the to-be-pushed data to a central cache node corresponding to the edge cache node; and send a second data push message to the edge cache node; where the second data push message includes an address of the central cache node and the identification of the to-be-pushed data, and the second data push message is used to instruct the edge cache node to obtain the to-be-pushed data from the central cache node.

The cache data control apparatus shown in this disclosure may perform the technical solution shown in the foregoing method embodiment. An implementation principle and a beneficial effect of the cache data control apparatus are similar to those of the technical solution, and details are not described herein again.

The foregoing descriptions (e.g., the foregoing descriptions of each of the embodiments) are merely specific implementations of this disclosure, but are not intended to limit the protection scope of this disclosure. Any variation or replacement readily figured out by a person skilled in the art within the technical scope disclosed in the present disclosure shall fall within the protection scope of this disclosure. Therefore, the protection scope of this disclosure shall be subject to the protection scope of the claims.

What is claimed is:

1. A cache data control method comprising:
    receiving, at a first edge cache node, a data obtaining request sent from a terminal device, wherein the data obtaining request comprises an identification of to-be-requested data; and
    determining whether the first edge cache node caches the to-be-requested data;
    when the first edge cache node caches the to-be-requested data, sending the to-be-requested data cached In the first edge cache node to the terminal device;
    when the first edge cache node does not cache the to-be-requested data, performing processing to determine a target cache node that caches the to-be-requested data in an edge cache node set corresponding to the first edge cache node and a central cache node corresponding to the first edge cache node; and obtaining the to-be-requested data from the target cache node;
    when the performed processing to determine the target cache node determines that the target cache node does not exist in the edge cache node set and the central cache node, sending a data obtaining request to the central cache node so that the central cache node obtains the to-be-requested data from another central cache node which is in direct communication with the central cache node, and receiving the to-be-requested data from the central cache node obtained from the another central cache node.

2. The method according to claim 1, wherein the determining of the target cache node that caches the to-be-requested data in an edge cache node set corresponding to the first edge cache node and the central cache node corresponding to the first edge cache node comprises:
    determining, based on the identification of the to-be-requested data, one or more hit cache nodes that cache the to-be-requested data in the edge cache node set and the central cache node; and
    determining the target cache node in the one or more hit cache nodes based on a quantity of hit cache nodes and a cache node type comprised in the one or more hit cache nodes.

3. The method according to claim 2, wherein the determining of the target cache node in the one or more hit cache nodes based on a quantity of hit cache nodes and a cache node type comprised in the one or more hit cache nodes comprises:
    when it is determined that the quantity of the hit cache nodes is 1, determining the hit cache node as the target cache node; or
    when it is determined that the one or more hit cache nodes comprise at least two second edge cache nodes, determining the target cache node in the at least two second edge cache nodes based on link quality between the first edge cache node and each second edge cache node; or
    when it is determined that the one or more hit cache nodes comprise a third edge cache node and the central cache node, sending a parallel request message to the third edge cache node and a parallel request message to the central cache node, receiving a parallel response message sent from the third edge cache node and a parallel response message sent from the central cache node, and determining a cache node corresponding to the parallel response message that is received first, as the target cache node.

4. The method according to claim 2, wherein when it is determined that no hit cache node exists in the edge cache node set and the central cache node, the method comprises:
    requesting to obtain the to-be-requested data from a data server; or
    sending the data obtaining request to the central cache node for obtaining the to-be-requested data.

5. An edge cache node, comprising a receiver and at least one processor, wherein
    the receiver is configured to receive a data obtaining request sent from a terminal device, wherein the data obtaining request comprises an identification of to-be-requested data;
    the at least one processor is configured to:
        determine whether the first edge cache node caches the to-be-requested data;
        when the first edge cache node caches the to-be-requested data, sending the to-be-requested data cached in the first edge cache node to the terminal device;
        when the edge cache node does not cache the to-be-requested data, perform processing to determine a target cache node that caches the to-be-requested data in an edge cache node set corresponding to the edge cache node and a central cache node corresponding to the edge cache node; and obtain the to-be-requested data from the target cache node;

when the performed processing to determine the target cache node determines that the target cache node does not exist in the edge cache node set and the central cache node, send a data obtaining request to the central cache node so that the central cache node obtains the to-be-requested data from another central cache node which is in direct communication with the central cache node, and receive the to-be-requested data from the central cache node obtained from the another central cache node.

6. The edge cache node according to claim 5, wherein the at least one processor is configured to:
   determine, based on the identification of the to-be-requested data, one or more hit cache nodes that cache the to-be-requested data in the edge cache node set and the central cache node; and
   determine the target cache node in the one or more hit cache nodes based on a quantity of hit cache nodes and a cache node type comprised in the one or more hit cache nodes.

7. The edge cache node according to claim 6, wherein the at least one processor is configured to:
   when it is determined that the quantity of hit cache nodes is 1, determine the hit cache node as the target cache node; or
   when it is determined that the one or more hit cache nodes include at least two second edge cache nodes, determine the target cache node in the at least two second edge cache nodes based on link quality between the edge cache node and each second edge cache node; or
   when it is determined that the one or more hit cache nodes comprise a third edge cache node and the central cache node, send a parallel request message to the third edge cache node and a parallel request message to the central cache node, receive a parallel response message sent from the third edge cache node and a parallel response message sent from the central cache node, and determine a cache node corresponding to the parallel response message that is received first, as the target cache node.

8. The edge cache node according to claim 6, wherein the edge cache node further comprises a transmitter, wherein
   the transmitter is configured to: when the at least one processor determines that no hit cache node exists in the edge cache node set and the central cache node, request to obtain the to-be-requested data from a data server; or
   the transmitter is configured to: when the at least one processor determines that no hit cache node exists in the edge cache node set and the central cache node, send the data obtaining request to the central cache node, so that the central cache node sends the to-be-requested data to the edge cache node after obtaining the to-be-requested data through the requesting.

9. The method according to claim 2, wherein the determining of the target cache node in the one or more hit cache nodes includes:
   determining that the one or more hit cache nodes includes at least two second edge cache nodes; and
   determining the target cache node in the at least two second edge cache nodes based on link quality between the first edge cache node and each of the second edge cache nodes.

10. The method according to claim 2, wherein the determining of the target cache node in the one or more hit cache nodes includes:
    determining that the one or more hit cache nodes includes another edge cache node and the central cache node;
    sending a parallel request message to the another edge cache node and the central cache node,
    receiving a parallel response message sent from the another edge cache node and a parallel response message sent from the central cache node, and
    determining a cache node corresponding to the parallel response message that is received first, as the target cache node.

11. The edge cache node according to claim 6, wherein the at least one processor is configured to:
    determine that the one or more hit cache nodes includes at least two second edge cache nodes; and
    determine the target cache node in the at least two second edge cache nodes based on link quality between the first edge cache node and each of the second edge cache nodes.

12. The edge cache node according to claim 6, wherein the at least one processor is configured to:
    determine that the one or more hit cache nodes includes another edge cache node and the central cache node;
    send a parallel request message to the another edge cache node and the central cache node,
    receive a parallel response message sent from the third edge cache node and a parallel response message sent from the central cache node, and
    determine a cache node corresponding to the parallel response message that is received first, as the target cache node.

* * * * *